(12) United States Patent
Nakashima

(10) Patent No.: US 8,237,544 B2
(45) Date of Patent: Aug. 7, 2012

(54) AUTOMATIC DOOR CONTROL SYSTEM AND METHOD

(75) Inventor: Kazuhiro Nakashima, Obu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1193 days.

(21) Appl. No.: 11/601,715

(22) Filed: Nov. 20, 2006

(65) Prior Publication Data

US 2007/0132553 A1 Jun. 14, 2007

(30) Foreign Application Priority Data

Nov. 25, 2005 (JP) ................................ 2005-340767

(51) Int. Cl.
B60R 25/00 (2006.01)
(52) U.S. Cl. ...................................... 340/5.72; 340/5.61
(58) Field of Classification Search .................. 340/825, 340/5.1–5.72, 1.1
See application file for complete search history.

(56) References Cited

U.S. PATENT DOCUMENTS

| | | | | | |
|---|---|---|---|---|---|
| 4,937,796 | A | * | 6/1990 | Tendler | 367/116 |
| 5,898,365 | A | * | 4/1999 | Niederlein | 340/425.5 |
| 5,929,769 | A | * | 7/1999 | Garnault | 340/5.61 |
| 6,194,997 | B1 | * | 2/2001 | Buchner et al. | 340/426.26 |
| 6,476,517 | B1 | | 11/2002 | Okada | |
| 6,552,649 | B1 | * | 4/2003 | Okada et al. | 340/5.61 |
| 6,556,125 | B1 | * | 4/2003 | Rohrl | 340/5.62 |
| 6,901,704 | B2 | | 6/2005 | Sakaue et al. | |
| 7,205,884 | B2 | * | 4/2007 | Kumazaki et al. | 340/5.61 |
| 7,336,151 | B2 | | 2/2008 | Ueda et al. | |
| 2001/0054952 | A1 | * | 12/2001 | Desai et al. | 340/5.72 |
| 2006/0030268 | A1 | | 2/2006 | Teshima et al. | |
| 2006/0061459 | A1 | * | 3/2006 | Kawamura et al. | 340/426.36 |

FOREIGN PATENT DOCUMENTS

| | | |
|---|---|---|
| EP | 1 055 789 | 5/2000 |
| JP | 10-211819 | 8/1998 |
| JP | 2000-104429 | 4/2000 |
| JP | 2004-132028 | 4/2004 |
| JP | 2004-132132 | 4/2004 |
| JP | 2005-155311 | 6/2005 |

OTHER PUBLICATIONS

German Official Action dated Apr. 28, 2008 issued in corresponding German Appln. No. 10 2006 053 615.0 with English translation.
Chinese Office Action dated Apr. 8, 2010, issued in corresponding Chinese Application No. 200610162521.2, with English translation.
Chinese Office Action dated Jan. 20, 2011, issued in corresponding Chinese Application No. 200610162521.2, with English translation.

* cited by examiner

Primary Examiner — Brian Zimmerman
Assistant Examiner — An T Nguyen
(74) Attorney, Agent, or Firm — Nixon & Vanderhye PC

(57) ABSTRACT

A main control ECU of a vehicle unit performs mutual communication with a portable device by external transmitters when respective vehicle doors provided with the automatic open/close function are open. The main control ECU further performs, after ID code matching is confirmed, the mutual communication with the portable device by the external transmitters again after a predetermined time. The main control unit still further performs, when the second matching is not confirmed, mutual communication with the portable device by an internal transmitter. The main control unit automatically closes the vehicle doors when the third matching is not confirmed.

16 Claims, 3 Drawing Sheets

AUTOMATIC DOOR CONTROL SYSTEM AND METHOD

CROSS REFERENCE TO RELATED APPLICATION

This application is based on and incorporates herein by reference Japanese Patent Application NO. 2005-340767 filed on Nov. 25, 2005.

FIELD OF THE INVENTION

The present invention relates to automatic door control system and method that control the states of doors of an object such as a vehicle, based on a result of mutual communication between a portable device and a control unit of the object.

BACKGROUND OF THE INVENTION

JP 10-211819A proposes a door control system that automatically closes vehicle doors. In this door control system, when an operation button provided in a portable device carried by a user is operated, a door closure command signal is transmitted from the portable device. On receiving the door closure command signal, the doors are closed.

In addition, another door control system is also proposed, which locks and unlocks respective vehicle doors, based on a result of ID code matching by mutual communication between a portable device (electronic key) and a vehicle unit. In this system, predetermined communication areas are set inside and outside a vehicle compartment, transmitters in the vehicle unit issue a request signal in each predetermined interval in the communication areas to perform code matching inside and outside the vehicle. In this way, approach to the vehicle, and getting on/off the vehicle by a user of the portable device are monitored.

By applying the door control system that uses mutual communication between a portable device and a vehicle unit to the vehicle door control system that automatically closes vehicle doors as proposed in JP 10-211819A, it is made possible to automatically close the vehicle doors, based on a result of ID code matching.

However, in the case of automatically closing doors, to prevent a portable device from being left confined within a vehicle compartment, it is necessary to detect its confinement. The confinement detection involves internal code matching when the user of the portable device has got off the vehicle, that is, when vehicle doors are open.

However, performing internal code matching with the vehicle doors open would expand a communication area originally set within a vehicle compartment to the outside of the vehicle compartment, because the vehicle doors are open. Expanding the communication area to the outside of the vehicle compartment might cause the possibility that the vehicle doors cannot be closed as a result of erroneous determination as if the portable device were within the vehicle compartment although it is actually outside the vehicle compartment. This will also arise when this door control system is applied to other objects such as a house.

To avoid such erroneous determination, it is possible to narrow the communication area. In this case, however, the confinement of the portable device may not be detected because of a narrowed communication area.

SUMMARY OF THE INVENTION

The present invention therefore has an object to provide an automatic door control system and method for avoiding confinement of a portable device inside a compartment.

According to one aspect of the present invention, in a door control system, mutual communication is performed so that a portable device returns a response signal including an ID code thereof in response to a request signal transmitted from a door side. An ID code matching is performed by comparing an ID code included in the response signal with a predetermined ID code thereby to control the states of the door. In this system, an internal communication unit communicates with the portable device in a vehicle compartment as a communication area, a detecting unit detects a location of the portable device by ID code matching, and a main control unit controls automatic door closing in response to a result of the ID code matching. With the door being opened, the main control unit, after determining that the portable device has moved outside a predetermined range of a periphery of the door from a detection result by the detecting unit, automatically closes the door when ID code matching for detecting whether the portable device is in the compartment is not confirmed as a result of mutual communication with the portable device.

BRIEF DESCRIPTION OF THE DRAWINGS

The above and other objects, features and advantages of the present invention will become more apparent from the following detailed description made with reference to the accompanying drawings. In the drawings:

FIGS. 4A and 4B are flowcharts showing the operation of an automatic vehicle door control system in a third embodiment of the present invention, wherein FIG. 4A is a flowchart showing the operation of a vehicle unit, and FIG. 4B is a flowchart showing the operation of a portable device.

DETAILED DESCRIPTION OF THE PREFERRED EMBODIMENTS

First Embodiment

Figure 1:
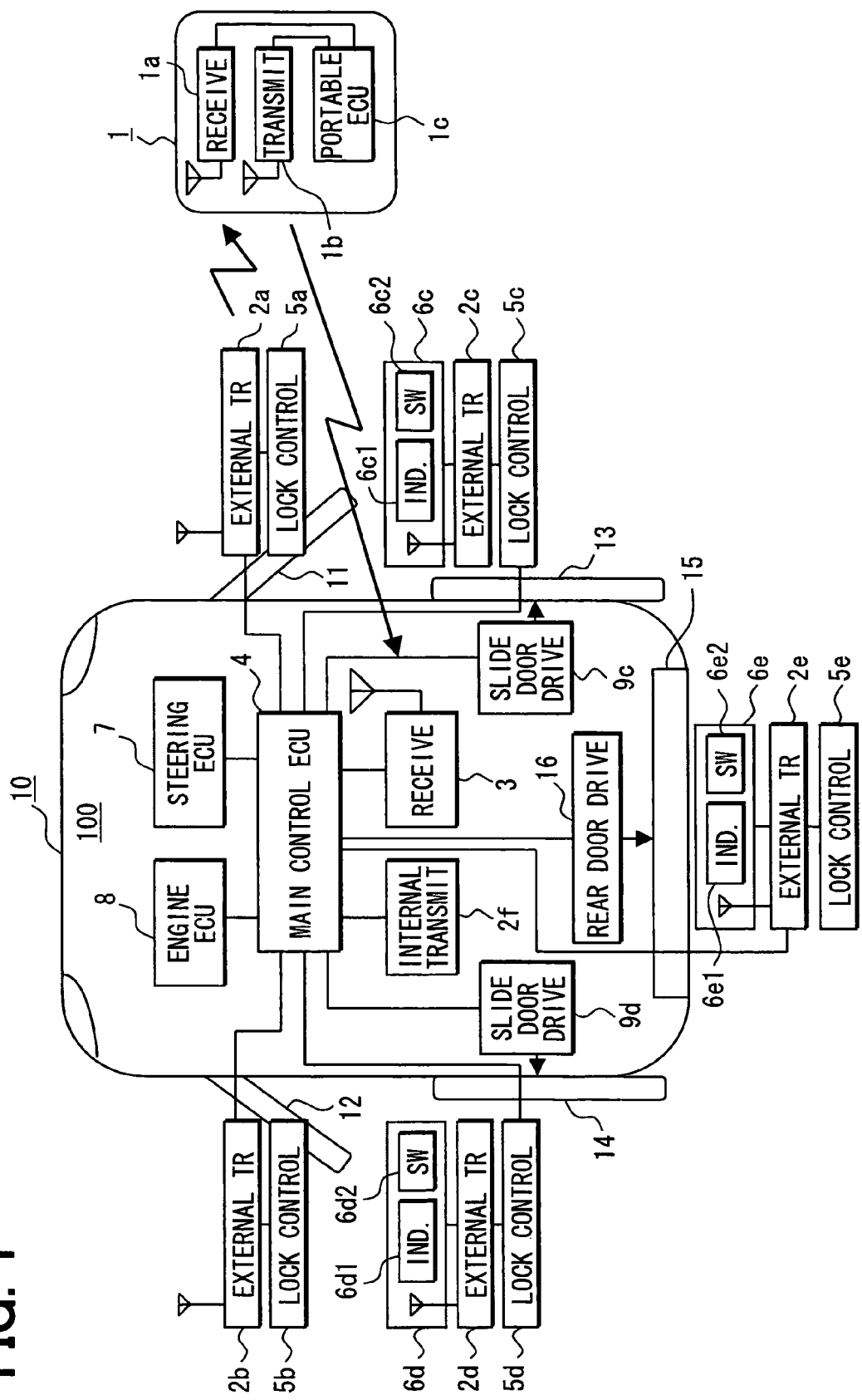
FIG. 1 is a block diagram showing an automatic vehicle door control system in a first embodiment of the present invention.

Referring first to FIG. 1, an automatic vehicle door control system is constructed with a portable device 1 carried by a vehicle user and a vehicle unit 100 mounted in a vehicle 10 to perform mutual communications. Based on a result of the matching of ID codes by mutual communications, a main control ECU 4 controls lock/unlock states of respective vehicle doors. To increase the security of a vehicle 10, the main control ECU 4 controls steering lock states, and allows and prohibits engine startup of the vehicle 10. Furthermore, the main control ECU 4 automatically opens and closes respective vehicle doors 13-15 provided with an automatic open/close function from the state of communication between the vehicle unit 100 and the portable device 1.

The portable device 1 includes a receiver 1a that receives a request signal from external transmitters 2a-2e or an internal transmitter 2f, and a transmitter 1b that transmits a response signal including an ID code and the like in response to the reception of the request signal. A portable device ECU 1c is connected with the receiver 1a and the transmitter 1b, and performs various control processing. Specifically, the portable device ECU 1c determines whether the request signal is received based on the receive signal of the receiver 1a, creates a response signal including its ID code and the like in response to the reception of the request signal, and transmits the response signal from the transmitter 1b.

The vehicle unit 100 includes external transmitters 2a-2e provided in the respective doors 11-15 in the vehicle 10, and an internal transmitter 2f provided in a vehicle compartment. These external transmitters 2a-2e and the internal transmitter 2f transmit request signals according to a transmission command signal from the main control ECU 4 forming a main portion of the vehicle unit 100.

The vehicle 10 is provided with hinged vehicle doors 11 and 12 (swing doors) correspondingly to front seats, and sliding vehicle doors 13 and 14 correspondingly to rear seats. These sliding vehicle doors (slide doors) 13 and 14 are provided with slide door driving devices 9c and 9d driven by motors, and can be opened and closed according to a command signal from the main control ECU 4. The vehicle 10 includes a springing-up rear door 15. The rear door 15 is also provided with a rear door driving device driven by a motor (automatic open/close device) 16, like a slide door driving devices (automatic open/close devices) 9c and 9d. The rear door 15 can automatically open and close according to a command signal from the main control ECU 4. Since the sliding vehicle doors 13 and 14, and the rear door 15 are often relatively heavy, the automatic open/close function helps to relieve vehicle passengers from burdens when getting on or getting off the vehicle. The automatic open/close function may be provided to the hinged vehicle doors (swing door) 11 and 12.

The reach distances of request signals of the external transmitters 2a-2e are set to about 1.0 m to 1.5 m. Therefore, when the vehicle 10 is parked, communication areas corresponding to the reach distances of the request signals are formed in the periphery of the respective vehicle doors 11-15 of the vehicle 10 so that it can be detected that the user of the portable device 1 has approached the vehicle 10. As for the external transmitters 2c-2e provided in the respective vehicle doors 13-15 provided with the automatic open/close function, communication areas corresponding to the reach distances of the request signals are formed in the periphery of the vehicle doors 13-15 so that it can be detected that the user of the portable device 1 has moved away from the vehicle 10. Specifically, the external transmitters 2c-2e also function as a detecting unit that detects the distance between the portable device 1 and the vehicle 10. A communication area by the internal transmitter 2f is set to cover the vehicle compartment so that it can be detected that the portable device 1 is within the vehicle compartment.

The vehicle unit 100 is provided within the vehicle compartment of the vehicle 10, and includes a receiver 3 that is enabled to receive a response signal synchronously with the output of a transmission command signal to the transmitters 2a-2f, and receives a response signal transmitted from the portable device 1. A response signal received by the receiver 3 is outputted to the main control ECU 4. The main control ECU 4 determines whether to perform control of door lock/unlock states and the like, based on a matching result of ID code included in the received response signal.

Furthermore, the vehicle unit 100 includes door lock control devices 5a-5e that are provided in the vehicle doors 11-15 of the vehicle 10, and control the vehicle doors 11-15 to a lock/unlock state. The door lock control devices 5a-5e operate according to a command signal from the main control ECU 4. The door lock control devices 5a-5e output lock and unlock states of the vehicle doors 11-15 to the main control ECU 4. The door lock control devices 5a-5e include a door state detection device comprising a courtesy switch that detects the open/close state of the vehicle doors 11-15, and outputs a detection signal showing the open/close state to the main control ECU 4.

In the vehicle 10, door handles 6c-6e of the vehicle doors 13-15 provided with the automatic open/close function are provided with indicators 6c1-6e1. The indicators 6c1-6e1 light and/or blink based on a command signal from the main control ECU 4. For example, when the user moves away from the vehicle 10, the vehicle doors 13-15 are automatically closed, and the indicators 6c1-6e1 notify the user of the portable device 1 that the portable device 1 is left or confined within the vehicle compartment.

The indicators may be provided in the vehicle door 11 and 12 not provided with the automatic open/close function to indicate a result of ID code matching. The indicators may be provided not only in the door handles 6c-6e of the vehicle doors 11-15 but also, for example, in a door trim of the vehicle compartment. Furthermore, a hazard lamp mounted in the vehicle and a winker mirror attached to a door mirror may be used as the indicators.

Although not shown, the vehicle 10 may be provided with a buzzer and a voice output unit that operates based on a command signal from the main control ECU 4, to notify the user of the portable device 1 that, when the user moves away from the vehicle 10, the vehicle doors 11-15 are automatically closed, and the portable device 1 is left confined within the vehicle compartment.

In this embodiment, as described above, based on a result of ID code matching and the like, the vehicle doors 13-15 provided with the automatic open/close function are controlled to be automatically opened and closed. However, the vehicle doors 13-15 include trigger switches (SW) 6c2-6e2 that command the main control ECU 4 to start control so as to transmit request signals in the external transmitters 2c-2e and automatically close the vehicle doors 13-15. The switches 6c2-6e2 are, for example, touch sensors provided in the door handles of the vehicle doors 13-15 and the like. The switches 6c2-6e2 are not limited to those provided in the door handles.

To increase the security of the vehicle 10, the vehicle door control system includes a steering lock ECU 7 and an engine ECU 8. These steering lock ECU 7 and engine ECU 8 turn on or off a steering lock, and allow or prohibit the vehicle engine operation, according to a command signal from the main control ECU 4. The following briefly describes processing by the steering lock ECU 7 and the engine ECU 8.

When the user of the portable device 1 opens and closes a door to get on the vehicle 10, and operates the engine switch provided in the vehicle, the main control ECU 4 performs mutual communication with the portable device 1 by using the internal transmitter 2f and the receiver 3 provided within the vehicle compartment, and performs matching of ID codes. On the other hand, the steering lock ECU 7 inquires of the main control ECU 4 whether the steering lock may be unlocked. When the matching of ID codes is confirmed (OK), that is, when a matching result is satisfied, the main control ECU 4 responds to the steering lock ECU 7 with the approval of unlocking the steering lock. The steering lock ECU 7 unlocks the steering lock, based on the response. In this way, steering lock states are controlled. Furthermore, at this time, the main control ECU 4 outputs a command signal to release the prohibition of engine startup to the engine ECU 8.

Figure 2:
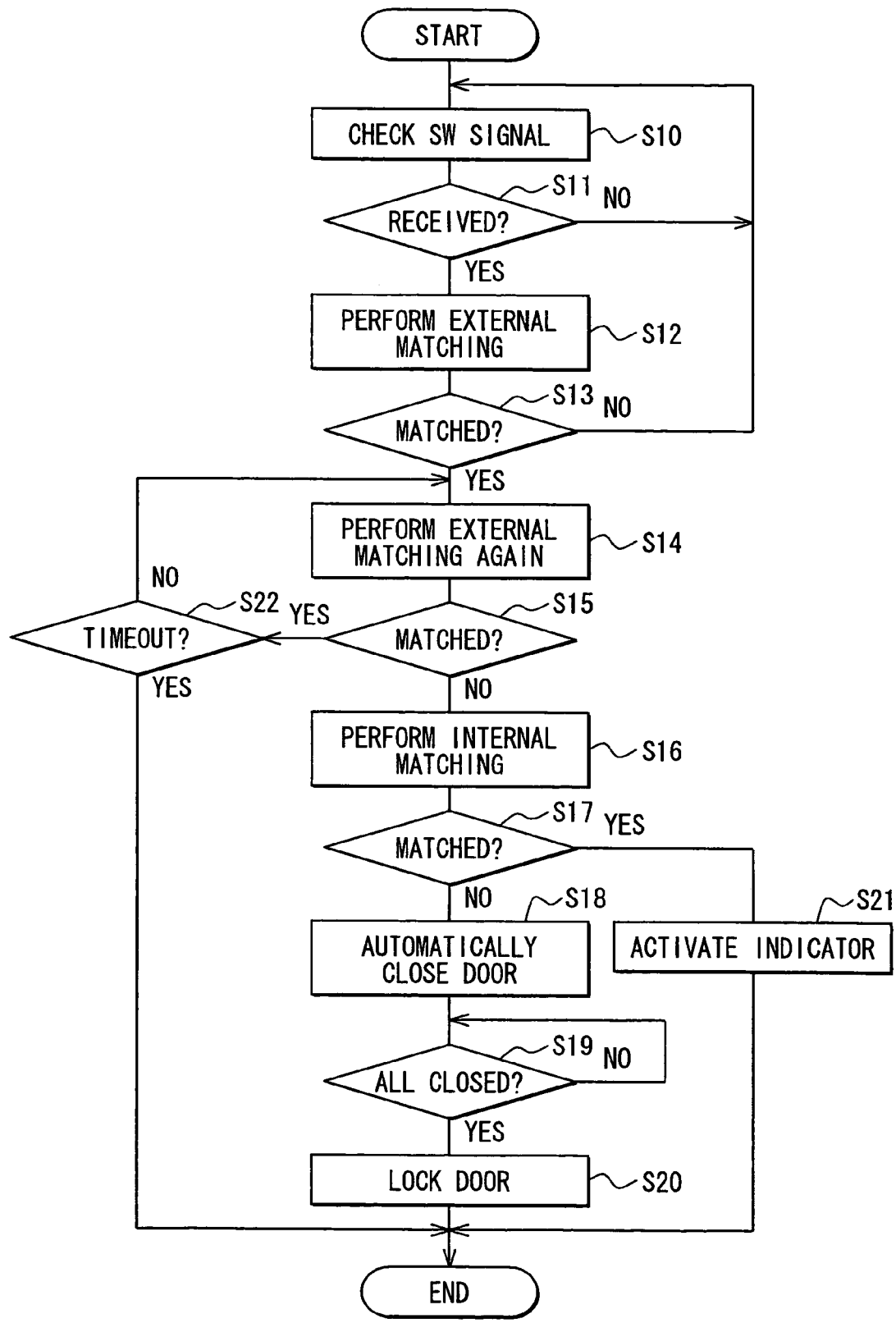
FIG. 2 is a flowchart showing the operation of a vehicle unit of the automatic vehicle door control system in the first embodiment of the present invention.

The vehicle unit 100, particularly the main control ECU 4, executes get-off-vehicle-time control shown in FIG. 2. In this control, when a user of the portable device 1 gets off the vehicle 10 and leaves the vehicle 10 without closing the vehicle doors 13-15 provided with the automatic open/close function, the vehicle doors 13-15 are automatically closed and locked.

Processing shown in FIG. 2 is periodically repeated, for example, when the engine of the vehicle 10 is stopped, when the vehicle doors 13 and 14 are opened after the engine is stopped, or when the vehicle door 15 is opened. Although the vehicle door 13 is referred to in FIG. 2, the same is also true for other vehicle doors 14 and 15 provided with the automatic open/close function. Moreover, when the hinged vehicle doors (swing door) 11 and 12 are provided with the automatic open/close function, the same is also true for the hinged vehicle doors 11 and 12.

At step S10, the main control ECU 4 checks a switch signal (operation signal) from the switch 6c2. That is, it detects a command to start the control of automatically closing the vehicle door 13. Step S11 determines whether a signal is sent and received from the switch 6c2, and on determining that the signal is received from the switch 6c2, proceeds to step S12, regarding as starting the control of automatically closing the vehicle door 13. On determining that the signal is not sent from the switch 6c2, the processing returns to step S10, regarding as not starting the control of automatically closing the vehicle door 13.

Step S11 determines whether the signal is received from the switch 6c2, and on determining that the signal is received from the switch 6c2, proceeds to step S12, regarding as starting the control of automatically closing the vehicle door 13. Alternatively, for example, when the signal from the switch 6c2 is successively outputted for a predetermined time, processing may proceed to step S12, regarding as starting the control of automatically closing the vehicle door 13. When the signal from the switch 6c2 is outputted a predetermined number of times, the processing may proceed to step S12, regarding as starting the control of automatically closing the vehicle door 13.

To determine whether the user of the portable device 1 is outside the vehicle compartment, step S12 performs mutual communication with the portable device 1 by the external transmitter 2c provided in the vehicle door 13 to perform external ID code matching as a first ID code matching check operation. Specifically, the main control ECU 4 determines whether a response signal is received from the portable device 1, in response to a request signal transmitted from the external transmitter 2c, or an ID code included in the response signal is in agreement (OK) with the predetermined ID code specific to the vehicle 10 by comparing the two ID codes (external ID code matching).

At step S13, the main control ECU 4 determines whether the ID code matching is OK (confirmed) to thereby check whether the portable device 1 is present near the door 13 based on the result of the matching at step S12. The main control ECU 4 proceeds to step S14 when determining that the matching is OK, that is, the matching result indicates agreement of codes, and regarding the user of the portable device 1 as being outside the vehicle compartment and near the door 11. When determining that the matching is not OK (matching is not confirmed), that is the matching result does not indicate agreement of codes because of absence of the portable device 1 near the door 13. Thus, the main control ECU 4 regards the user of the portable device 1 as being not near the vehicle compartment.

At step S14, the main control ECU 4 again performs the external code matching as a second ID code matching check operation after a predetermined time elapses, to determine whether the portable device 1 has moved beyond a predetermined range of the periphery of the vehicle 10, that is, the user of the portable device 1 has moved away from the vehicle 10 by the predetermined range. The main control ECU 4 determines whether a response signal is received from the portable device 1, in response to a request signal transmitted from the external transmitter 2c, or a result of matching of an ID code included in the response signal is NG.

Thus, when the external code matching at step S13 is matching OK, that is, a matching result indicates a code agreement, and when the external code matching performed again after the predetermined time is matching NG, that is, a matching result does not indicate a code agreement since the user of the portable device 1 probably got off the vehicle 10, moved away from the vehicle 10, and went out of a communication area of the external transmitter 2c, it can be determined whether the distance between the portable device 1 and the vehicle 10 is within a reach distance of the request signal.

At step S15, the main control ECU 4 determines whether the ID codes are in agreement (matched) based on the result of the external code matching at step S14. When the main control ECU 4 determines that the matching is NG, that is, when determining that the matching result does not indicate a code agreement, and regarding the user of the portable device 1 as having moved away from the vehicle more than the predetermined range, it proceeds to step S16. When the main control ECU 4 determines that the matching is OK, that is, the codes agree, and regarding the user of the portable device 1 as having not moved away from the vehicle by the predetermined range, it proceeds to step S22.

Step S22 determines whether the user of the portable device 1 is within the predetermined range outside the vehicle compartment and the predetermined time has elapsed, that whether a timeout occurs. The main control ECU 4 counts elapsed time after matching is detected at step S15, using a counter not shown or the like. When the predetermined time does not elapse and no timeout occurs, since the user of the portable device 1 still stays in the communication area formed in the periphery of the vehicle door 13, the processing returns to step S14. When the predetermined time elapses and a timeout occurs, the processing terminates.

At step S16, the main control ECU 4 performs internal ID code matching as a third ID code matching check operation by using the internal transmitter 2f. This is done to determine whether the portable device 1 has been left confined within the vehicle compartment when it is left in the vehicle compartment and the vehicle door 13 has been locked.

At step S17, when the main control ECU 4 does not receive the response signal from the portable device 1 in response to the request signal from the internal transmitter 2f, based on the result of the internal code matching of step S16, or when the matching is NG, that is, the matching result does not indicate a code agreement, since it is determined that the portable device 1 is outside the vehicle compartment, the processing proceeds to step S18. On the other hand, when the main control ECU 4 receives the response signal from the portable device 1 in response to the request signal from the internal transmitter 2f, and the matching is OK, that is, the matching result indicates a code agreement, since the portable device 1 may be confined, the processing proceeds to step S21 to indicate confinement.

At step S21, the main control ECU 4 activates (lights and/or blinks) the indicator 6c1 provided in the door steering wheel 6c of the vehicle door 13 to notify the user of portable device 1 that the portable device 1 is confined within the vehicle compartment.

Thus, after the user of the portable device 1 has moved away by the predetermined range from the vehicle 10 while holding the portable device 1, since it is determined that the portable device 1 is not within the vehicle compartment, by mutual communication with the portable device 1 by the internal transmitter 2f, the erroneous determination that the portable device 1 is within the vehicle compartment although the portable device 1 is outside the vehicle compartment can be avoided. Thus, erroneous automatic closing operation of the vehicle door 13 can be prevented. Furthermore, the confinement of the portable device 1 within the vehicle compartment can be prevented without fail because of the absence of the need to reduce communication areas by the internal transmitter 2f.

Step S18 automatically closes the vehicle door 13. The main control ECU 4 automatically closes the vehicle door 13 by outputting a door close signal to the slide door driving device 9c.

At step S19, the main control ECU 4, to lock all the vehicle doors 11-15, determines whether all the vehicle doors 11-15 are closed, from detection signals from door state detection devices. On determining that all the vehicle doors 11-15 are closed, the main control ECU 4 executes step S20. When not all the vehicle doors 11-15 are closed, the main control ECU 4 repeats determination at step S19 for a predetermined time.

At step S20, the main control ECU 4 outputs a command signal to the door lock control devices 5a-5e provided in the vehicle doors 11-15 to lock all the vehicle doors 11-15.

Thus, since the vehicle door 13 is closed by the slide door driving device 9c, and the vehicle doors 11-15 are locked when all the vehicle doors 11-15 are closed the vehicle doors 11-15 are locked only when the user of the portable device 1 moves away from the vehicle while holding the portable device 1.

When the first external code matching at step S13 is OK, before the second external code matching (step S14) is performed after the predetermined time, it is preferable to report to the user of the portable device 1 by lighting and/or blinking the indicator 6c1 that the vehicle door 13 will be automatically closed when he (or she) moves away from the vehicle 10.

Before automatically closing the vehicle door 13 by the slide door driving device 9c at step S18, that is, when matching is NO at step S17, it is preferable to report to the user of the portable device 1 by lighting and/or blinking the indicator 6c1 that the vehicle door 13 will be automatically closed. This is because the user of the portable device 1 may have uncertainty in moving away from the vehicle 10 when the vehicle door 13 is open. However, by reporting that the vehicle door 13 will be automatically closed, a feeling of security can be given to the user of the portable device 1.

That the vehicle door 13 will be automatically closed by the slide door driving device 9c may be reported to the user of the portable device 1 by using the portable device 1. Specifically, the portable device 1 may be provided with a vibrator and/or buzzer as a reporting unit (closure reporting unit). Before automatically closing the vehicle door 13 by the slide door driving unit 9c at step S18, that is, when matching is NO at step S17, the main control ECU 4 may transmit a closure report signal to the portable device 1 by using the external transmitter 2c. On receiving the closure report signal, the portable device 1 vibrates the vibrator and/or sounds the buzzer to report to the user of the portable device 1 that the vehicle door 13 will be automatically closed. In this way, by reporting to the user of the portable device 1 that the vehicle door 13 will be automatically closed, not in the vehicle unit 100 but in the portable unit 1, the user of the portable device 1 can more easily confirm that the vehicle door 13 will be automatically closed.

Second Embodiment

Figure 3:
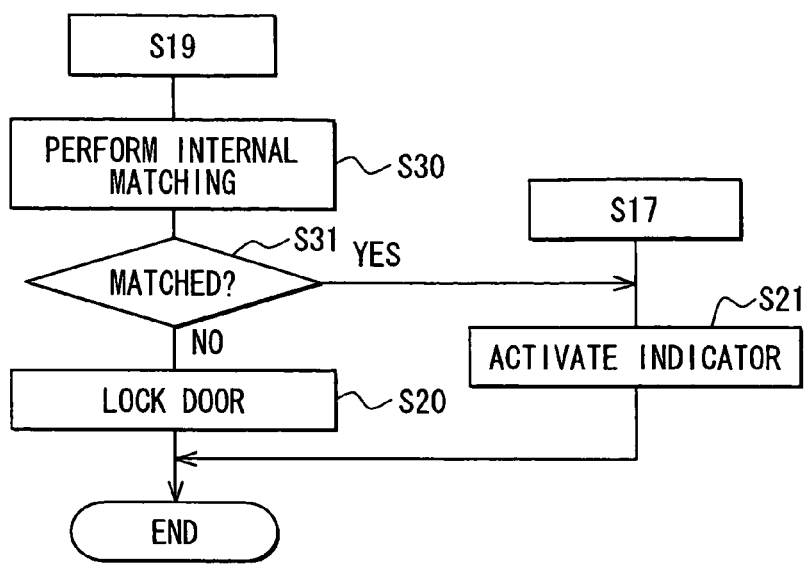
FIG. 3 is a flowchart showing the operation of a vehicle unit of an automatic vehicle door control system in a second embodiment of the present invention.

The second embodiment is different from the first embodiment in that between step S19 and step S20 (FIG. 2), steps S30 and S31 shown in FIG. 3 are executed. Specifically, before locking the vehicle door 13, it is again determined whether the portable device 1 may be confined within the vehicle compartment.

The main control ECU 4, in determining at step S19 (FIG. 2) whether all the vehicle doors 11-15 are closed, from detection signals from the door state detection devices, when all the vehicle doors 11-15 are closed, performs internal code matching at step S30 again as a fourth ID code matching check operation. At step S31, when the main control ECU 4, based on a result of internal code matching of step S30, does not receive the response signal from the portable device 1 in response to the request signal from the internal transmitter 2f, or when matching is NO, that is, when a matching result does not indicate a code agreement, it proceeds to step S20 (FIG. 2) because the portable device 1 is outside the vehicle compartment. On the other hand, the main control ECU 4 receives the response signal from the portable device 1 in response to the request signal from the internal transmitter 2f, and when matching is OK, that is, when the matching result indicates a code agreement, since the portable device 1 may be confined, the processing proceeds to step S21 to report confinement.

Thus, internal code matching is executed twice (S16 and S30), and when a result of internal code matching is NO when all the vehicle doors 11-15 are closed the vehicle doors are locked. Therefore, the confinement of the portable device 1 within the vehicle compartment can be prevented more certainly.

Third Embodiment

The third embodiment is different from the first and the second embodiments in that, in comparison with communication areas between the vehicle unit 100 and the portable device 1 during the first external code matching (S12), communication areas during subsequent external code matching can be made narrower. This is done to close at an earlier time the vehicle doors 13-15 provided with the automatic open/close function.

Figure 4A:
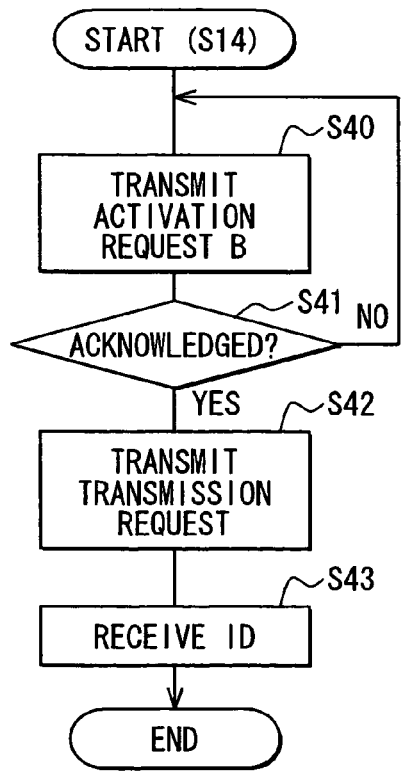
Figure 4B:
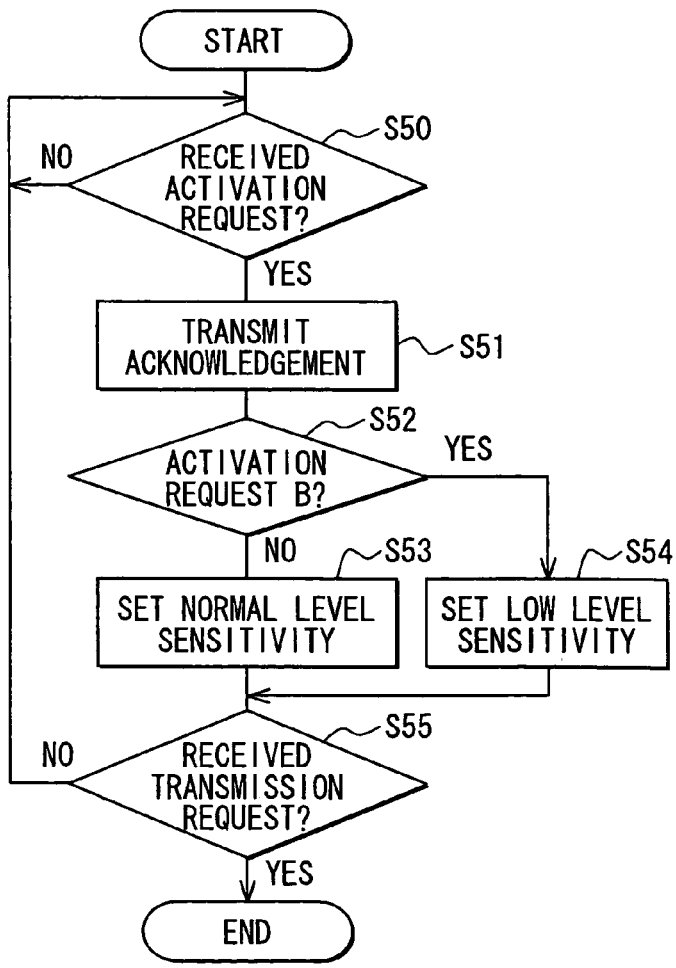

A communication area between the vehicle unit 100 and the portable device 1 is narrowed by processing shown in FIGS. 4A and 4B. First, a communication procedure for mutual communication between the external transmitters 2c-2e in the vehicle unit 100 and the portable device 1 is described. It is assumed that the portable device 1 communicates with the external transmitter 2c in the vehicle unit 100.

Before communication is started, the portable device 1 is in a sleep state. The external transmitter 2c of the vehicle unit 100 transmits an activation request signal for waking up (activating) the portable device 1. The portable device 1 is waked up (activated) by the activation request signal, and returns a first acknowledge signal (first ACK signal).

When the receiver 3 receives the first ACK signal, when the external transmitter 2c has a vehicle ID code unique to the vehicle and the portable device 1 has the same vehicle ID code, the external transmitter 2c transmits a first transmission request signal to request the return of a second acknowledge signal (second ACK signal). On receiving the first transmission request signal, the portable device 1 returns the second ACK signal when it has the same vehicle ID code as the vehicle ID code included in the first transmission request signal.

When the receiver 3 receives the second ACK signal, the external transmitter 2c includes a code unique to the transmitter and transmits a second transmission request signal to request the transmission of an ID code. The portable device 1 creates a response code by using the code included in the second transmission request signal, and transmits a response signal including the response code and the ID code. When the external transmitter 2c transmits the activation request signal and the first transmission request signal, if the first and the second ACK signals are not returned from the portable device 1, the portable device 1 is regarded as being not within the communication area, and the communication terminates.

As described above, since the response code is created using the ID code unique to the transmitter, the main control ECU 4 can determine from the response code in response to the signal from what transmitter the portable device 1 transmitted the response signal. In the above communication processing, the activation request signal and the first and the second transmission request signals correspond to the request signals transmitted from the transmitter, and the first and the second ACK signals and the response signal correspond to the response signals transmitted from the portable device 1. In the above communication procedure, the transmission of the first transmission request signal from the vehicle unit 100 and the transmission of the second ACK signal corresponding to it may be omitted (omitted in the descriptions below).

To reduce the communication area between the vehicle unit 100 and the portable device 1, the reception sensitivity level of the request signal in the portable device 1 can be set lower than a normal level.

The portable device 1 receives a command concerning a reception sensitivity level from the vehicle unit 100, and sets a reception sensitivity level at the specified level. Specifically, the vehicle unit 100 transmits an activation request signal A to the portable device 1 during external code matching of step S12 (FIG. 2). On the other hand, during external code matching of step S14 (FIG. 2), the vehicle unit 100 transmits an activation request signal B different from the activation request signal A to the portable device 1. In this way, the vehicle unit 100 transmits two types of activation request signals to the portable device 1.

The flowchart shown in FIG. 4A shows communication processing during the second external code matching of step S14 (FIG. 2). At step S40, the main control ECU 4 transmits the activation request signal B (low sensitivity signal) by the external transmitter 2c.

At step S41, the main control ECU 4 determines whether ACK is present, that is, whether the receiver 3 has received ACK transmitted from the portable device 1. When the main control ECU 4 determines that the receiver 3 has received the ACK signal, at step 42, it transmits the transmission request signal that includes a code unique to the transmitter and requests the transmission of the ID code, by the external transmitter 2c. On the other hand, when the main control ECU 4 determines that the receiver 3 does not receive the ACK signal, the processing returns to step S40. At step S43, the main control ECU 4 receives the response signal including the response code and the ID code transmitted from the portable device 1 by the receiver 3, and terminates the communication.

On the other hand, when the portable device 1 has received the activation request signal from the vehicle unit 100, it returns the ACK signal (step S51) as shown in FIG. 4B. The portable device 1 then determines whether it is the activation request signal A or activation request signal B (low sensitivity signal) at step S52. When it is determined by this determination processing that the activation request signal is B (YES), the portable device 1 sets the reception sensitivity level of the reception of the first and the second transmission request signals to the low level at step S54. The reception sensitivity level may be brought into a low level, for example, by reducing the amplification degree of an amplifier of a received signal in the receiver 1a of the portable device 1. Of course, the reception sensitivity level may be lowered by other methods. On the other hand, when it is determined that the activation request signal is A (NO), the reception sensitivity level is set to a normal level at step S53.

It is determined whether the portable device 1 has received the transmission request signal at step S55. When it is determined that it has received a transmission request signal (YES), it creates the response code by using the ID code included in the transmission request signal, and transmits the response signal including the response code and the ID code. On the other hand, when it is determined that the portable device 1 does not receive the transmission request signal (NO), the processing returns to step S50.

In this way, the vehicle unit 100 can give an instruction of a reception sensitivity level to the portable device 1.

Thus, in comparison with the reception sensitivity level during first external code matching, the reception sensitivity level during subsequent external code matching is set lower. In comparison with communication areas during the first external code matching, communication areas during subsequent external code matching can be made smaller. Since it can be determined at an earlier time point that the portable device 1 has moved out of a predetermined range of the periphery of the vehicle 10, that is, that the user of the portable device 1 has moved away from the vehicle 10, the vehicle doors 13-15 provided with the automatic open/close function can be closed at the earlier time.

In this way, by closing the vehicle doors 13-15 provided with the automatic open/close function at the earlier time, a sense of security that the vehicle doors never fail to be closed can be given to the user.

In the above embodiments, to reduce the vehicle unit 100 and the portable device 1, when the request signal is transmitted from the vehicle unit 100, the output strength level of the request signal may be reduced. For detecting the distance between the portable device 1 and the vehicle 10, a sonar or the like for detecting the distance between the portable device 1 and the vehicle 10 may be used. Further, the present invention may be applied to other objects such as a house or office.

What is claimed is:

1. A door control system in which, by performing mutual communication that a portable device returns a response signal including an ID code in response to a request signal transmitted from a vehicle unit, the vehicle unit receives the response signal from the portable device, and matches the ID code included in the response signal with a predetermined ID code specific to a vehicle, and controls the state of a vehicle door, wherein the vehicle unit comprises:
an internal communication unit that communicates with the portable device in a vehicle compartment as a communication area;
an automatic open/close device that automatically closes the vehicle door;
a detecting unit that detects a distance between the portable device and the vehicle;
a main control unit that, with the vehicle door opened, after determining that the portable device has moved out of a predetermined range of a periphery of the vehicle from a detection result by the detecting unit, automatically closes the vehicle door by the automatic open/close device when ID code matching is not confirmed as a result of mutual communication with the portable device by the internal communication unit;
wherein:
the detecting unit includes an external communication unit that defines the predetermined range outside the vehicle as the communication area of the portable device;
the main control unit determines that the portable device has moved out of the predetermined range of the vehicle, when the code matching is changed from being confirmed to not being confirmed after a predetermined time as a result of mutual communication with the portable device by the external communication unit, with the vehicle door opened;

the main control unit outputs a low sensitivity signal to the portable device, the low sensitivity signal instructing the portable device to drop reception sensitivity level thereof for the request signal;

the portable device changes its reception sensitivity level to a lower sensitivity level when receiving the low sensitivity signal; and the main control unit outputs the low sensitivity signal after the code matching is confirmed at least once as a result of mutual communication with the portable device by the external communication unit with the vehicle door being open.

2. The door control system according to claim 1, wherein the vehicle unit further comprises:

a door state detecting unit that detects open/close states of the vehicle door; and a lock control unit that controls locking/unlocking of the vehicle door, the lock control unit automatically locking the vehicle door when the vehicle door is closed by the automatic open/close device, and the door state detecting unit detects that the vehicle door is closed.

3. The door control system according to claim 2, wherein:

the main control unit performs mutual communication with the portable device and matching by the internal communication unit when the door state detecting unit detects that the vehicle door is closed; and the lock control unit locks the vehicle door when the vehicle door is closed, and the matching is not confirmed as a result of mutual communication with the portable device by the internal communication unit.

4. The door control system according to claim 1, wherein the vehicle unit further comprises:

an indicator unit that, when the code matching is confirmed as a result of mutual communication with the portable device by the external communication unit with the vehicle door being open, indicates that the vehicle door will be automatically closed before starting mutual communication with the portable device again by the external communication unit after a predetermined time.

5. The door control system according to claim 1, wherein the vehicle unit further comprises:

an indicator unit that indicates that the vehicle door will be automatically closed by the automatic open/close device.

6. The door control system according to claim 1, wherein:

the vehicle unit transmits a door closure command signal to the portable device when automatically closing the vehicle door by the automatic open/close device; and the portable device indicates that the vehicle door will be automatically closed when receiving the door close report command signal.

7. The door control system according to claim 1, wherein:

the vehicle unit includes an indicator unit that, when the code matching is confirmed as a result of mutual communication with the portable device by the internal communication unit, indicates that the portable device is confined within the vehicle compartment.

8. The door control system according to claim 1, wherein:

the vehicle unit is provided in the vehicle and includes a switch that outputs an operation signal to indicate a door operation; and the main control unit performs detection by the detecting unit when the operation signal is outputted with the vehicle door opened.

9. The door control system according to claim 8, wherein:

the main control unit performs detection by the detecting unit when the operation signal is successively outputted for a predetermined time.

10. The door control system according to claim 8, wherein:

the main control unit performs detection by the detecting unit when the operation signal is successively outputted a predetermined number of times.

11. The door control system according to claim 1, wherein:

the detecting unit includes a sonar that detects the distance between the portable device and the vehicle.

12. The door control system according to claim 1, wherein: the vehicle door includes a slide door.

13. The door control system according to claim 1, wherein: the vehicle door includes a rear door.

14. The door control system according to claim 1, wherein: the vehicle door includes a swing door.

15. A machine-implemented door control method for a door of a compartment by communication with a portable device used to open/close the door, the method comprising use of at least one programmed processor in the portable device and at least one programmed processor affixed to said compartment to effect:

detecting whether a compartment door is open;

performing, when the compartment door is detected as being open, a first ID code matching between an ID code received from the portable device during the communication with the portable device and a predetermined ID, the ID code of the portable device being received from the portable device in response to a request signal transmitted toward an outside of the compartment;

performing, after a confirmation of the first ID code matching indicating that the portable device is present near the door, a second ID code matching between the ID codes;

performing, a third ID code matching between the ID codes, the ID code of the portable device being received from the portable device in response to a request signal transmitted toward an inside of the compartment;

closing automatically the door in response to a non-confirmation of both the second ID code matching and the third ID code matching indicating that the portable device is absent from the door and absent in the compartment, respectively;

transmitting, in the performing of the second ID code matching, an activation request signal toward the outside of the compartment requesting a lowered level sensitivity; and setting a reception sensitivity of the portable device to a lowered level in response to the activation request signal so that the portable device receives a response transmission request signal with a lowered sensitivity, which is lower than specified sensitivity provided in the first ID code matching.

16. The door control method according to claim 15, further comprising:

performing, after automatic closing of the door, a fourth ID code matching between the ID codes, the ID code of the portable device being received from the portable device in response to a request signal transmitted toward the inside of the compartment; and locking automatically the door in response to a non-confirmation of the fourth ID code matching indicating that the portable device is absent in the compartment.

* * * * *